(No Model.)
W. E. GIBBS.
VALVE FOR PNEUMATIC TIRES.
No. 560,492. Patented May 19, 1896.
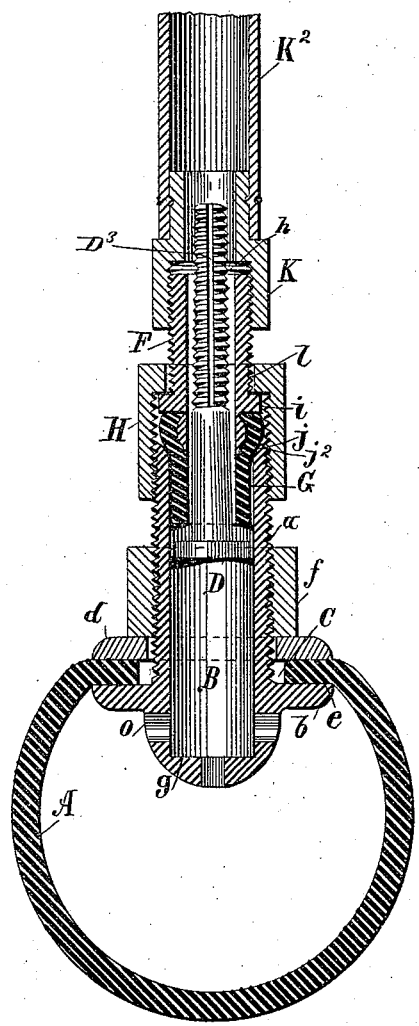
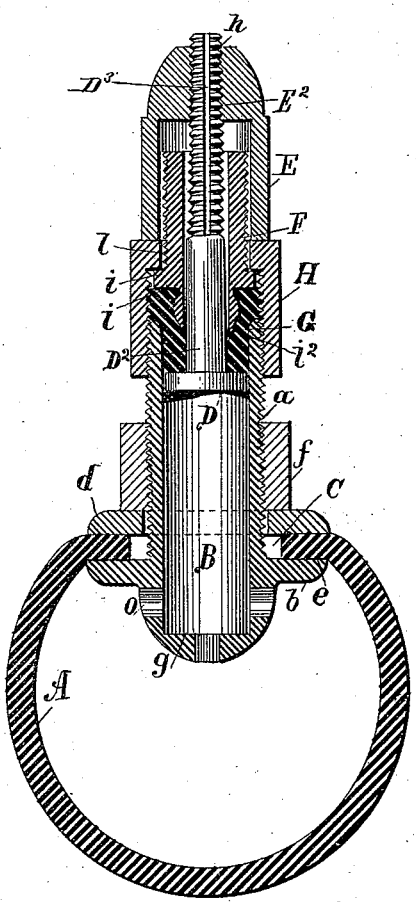
WITNESSES
INVENTOR
William E. Gibbs

UNITED STATES PATENT OFFICE.

WILLIAM E. GIBBS, OF NEW YORK, N. Y., ASSIGNOR TO THE REDWAY MANUFACTURING COMPANY, OF NEW JERSEY.

VALVE FOR PNEUMATIC TIRES.

SPECIFICATION forming part of Letters Patent No. 560,492, dated May 19, 1896.

Application filed April 25, 1894. Serial No. 508,937. (No model.)

*To all whom it may concern:*

Be it known that I, WILLIAM E. GIBBS, a citizen of the United States, residing in the city, county, and State of New York, have invented certain new and useful Improvements in Valves for Pneumatic Tires, of which the following is a specification.

My invention relates more particularly to valves for use on pneumatic tires that are used on bicycles, sulkies, and other vehicles; and it has for its object to provide improved means to permit air to be pumped into the tire and to prevent the escape or leakage of air through the valve.

The invention consists in the novel details of improvement and the combinations of parts that will be more fully hereinafter set forth, and then pointed out in the claims.

Referring to the accompanying drawings, which form a part of this specification, Figure I is a vertical cross-section of my improved valve shown in position on a tubular tire, the parts being in position to permit air to be pumped into the tire. Fig. II is a similar section showing the valve closed to prevent the egress of air from the tire through the valve.

In the drawings the letter A indicates a suitable inflatable tire adapted to receive and retain air under pressure.

B is the main body portion of my valve mechanism, being shown of tubular form, open at both ends, and provided with external threads $a$ and a flange $b$ near the end that engages the tire A. The body B is adapted to pass into an opening $c$ in tire A, so that the flange $b$ will engage the inner wall of said tire at said opening, as shown.

$d$ is a washer or flange placed upon the body B and adapted to rest upon the part $e$ of tire A, whereby the latter part may be clamped between flange $b$ and washer $d$.

$f$ is a nut or the like working upon threaded portion $a$ of body B and arranged to press upon washer $d$ to force it against tire A, as shown.

By the above means the body B can be firmly secured to the flexible tire, making an air-tight joint; but the body B can be otherwise suitably attached to the tire, if desired.

D is a valve located in tubular body B and having free longitudinal motion therein, an internal abutment $g$ in body B preventing the valve passing through the lower end of said body. O are openings in the side of the body B to permit entrance of the air. The valve D is shown in disk form and provided with a stem $D^2$, that projects beyond body B, and is provided at its outer end with screw-threads $h$ to receive a cap E, as hereinafter explained. The stem $D^2$ is also shown provided with a groove $D^3$ for the passage of air. The stem $D^2$ is preferably tapered from the valve D outwardly for a distance, as shown.

F is a tube adapted to receive the stem $D^2$ of valve D, and it is provided with a flange $i$ and nipple extension $j$, upon which a packing-tube G, of rubber or other suitable material, is placed, the lower end of said packing G passing snugly into body B, so that valve D can abut against it, as shown. The nipple extension $j$ is preferably oval or curved on its exterior, so as to cause the packing G at $j^2$ to swell out at its upper part to make an overlapping tight junction with the body B. The stem $D^2$ passes freely through the tube F, as indicated in the drawings, to permit the passage of air.

H is an internally-threaded sleeve adapted to work upon threads $a$ of body B, and it is provided with an internal flange $l$, that bears upon flange $i$ of tube F, so as to hold the latter and packing G upon body B, as shown. By forcing down sleeve H the packing G will be expanded at the part $j^2$ and forced against the end of body B, to form a tight fit therewith.

K is a coupling or sleeve adapted to fit on tube F and to be connected with a tube or the like $K^2$, (see Fig. I,) that may lead from a suitable air-pump.

The operation is as follows: When the air is not compressed in tire A, valve D will be free to move and may rest upon abutment $g$ in body B. Air being now forced into the tire, it will pass through tube F, packing G, body B, and around stem $D^2$ and valve D until it is sufficiently compressed to sustain valve D, whereupon the latter will be pressed against packing G, as in Fig. II. A continued forcing in of air causes valve D to descend at each stroke of the pump and the back pressure of the air presses it against the packing G. By this means during the back stroke of the pump air is prevented from escaping. The tapering shape of the stem $D^2$ assists in quickly closing the passage through the packing-tube G, while at the same time permitting a proper passage of air into tire A. The groove $D^3$ in stem $D^2$ also facilitates the passage of air along stem $D^2$ at its threaded portion, although this groove could be dispensed with. After the tire A has been thoroughly inflated the sleeve K is removed, the valve D then preventing the escape of the air, being firmly held against packing G by the air under compression. The cap E is next placed in position upon stem D, its lower edge resting upon sleeve H, where the cap finds a bearing. The threads $E^2$ of cap E now engage threads $h$ of stem $D^2$, and as cap E is turned cause the stem $D^2$ and valve D to rise, thereby pressing the valve firmly against tubular packing G, thus spreading the latter in body B and tightly closing any egress for the air.

My device is simple in construction and therefore can be operated by the user of the bicycle or vehicle without trouble. It is inexpensive to manufacture, not liable to get out of order, and effective in operation.

Having thus described my invention, the following is what I claim as new therein and desire to secure by Letters Patent:

1. The combination of the hollow body B, the tube F formed with the nipple extension $j$, the packing-tube G fitting over the nipple extension forming a swell which fits snugly against the end of body B, said packing-tube extending into body B, means for securing tube F to body B, valve D supported in body B below packing G and having a valve-stem $D^2$ extending through said packing, and means for pressing the valve firmly against the packing, substantially as set forth.

2. The combination of the hollow body B, the tube F formed with nipple extension $j$ and annular flange $i$, the packing-tube G fitting over the nipple extension and against the flange $i$ forming a swell which rests on end of body B, means for securing tube F to body B, valve D supported in body B below packing-tube G and having a valve-stem $D^2$ which latter extends through packing and tube F and is formed with groove $D^3$, a threaded portion on stem $D^2$, and nut E engaging said threaded end and adapted to force valve against packing, substantially as set forth.

WILLIAM E. GIBBS.

Witnesses:
 L. WOOLSEY,
 M. V. BIDGOOD.